Dec. 19, 1950 W. W. LOOSE 2,534,720
RESPIRATOR
Filed Nov. 29, 1949 2 Sheets-Sheet 1
FIG. 1.
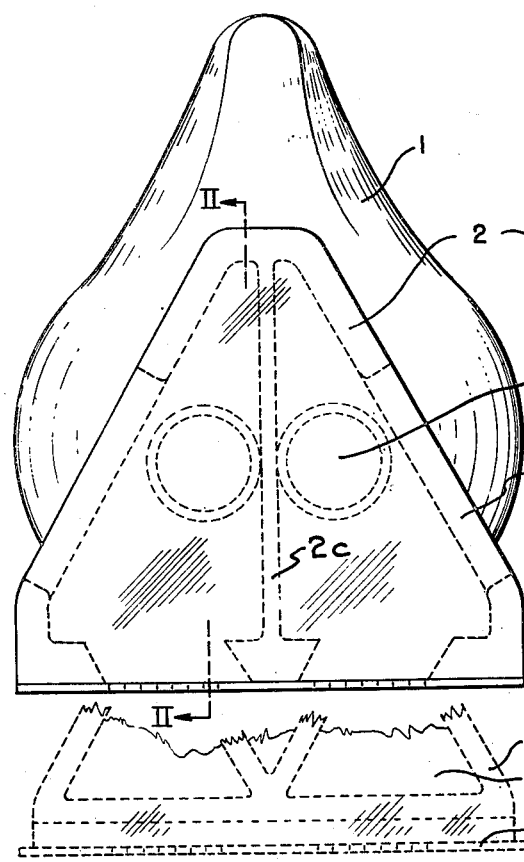
FIG. 2.
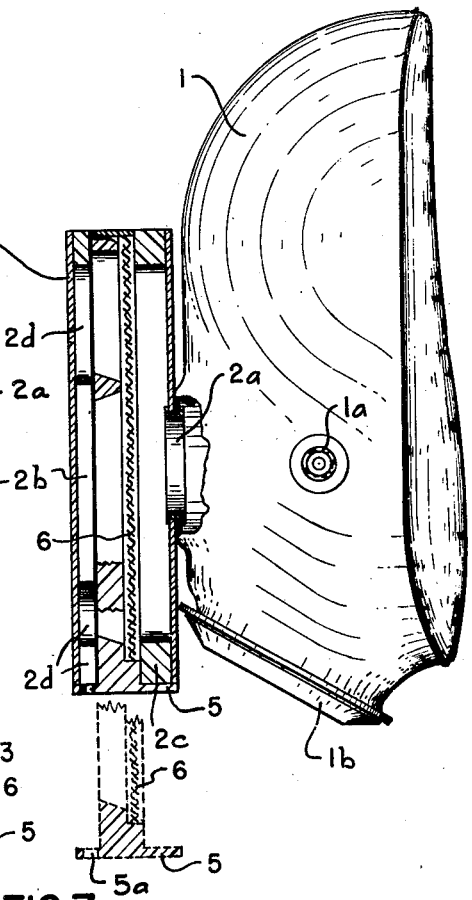
FIG. 3.
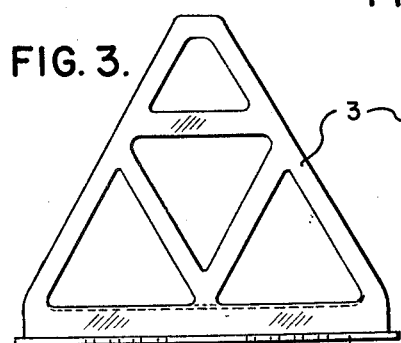
FIG. 4. FIG. 7.
FIG. 6.
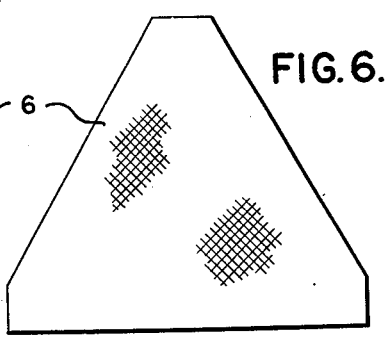
FIG. 5.
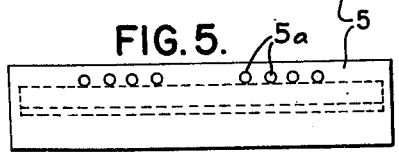
INVENTOR.
WINFIELD W. LOOSE.
BY
attorney Dec. 19, 1950 W. W. LOOSE 2,534,720
RESPIRATOR
Filed Nov. 29, 1949 2 Sheets-Sheet 2
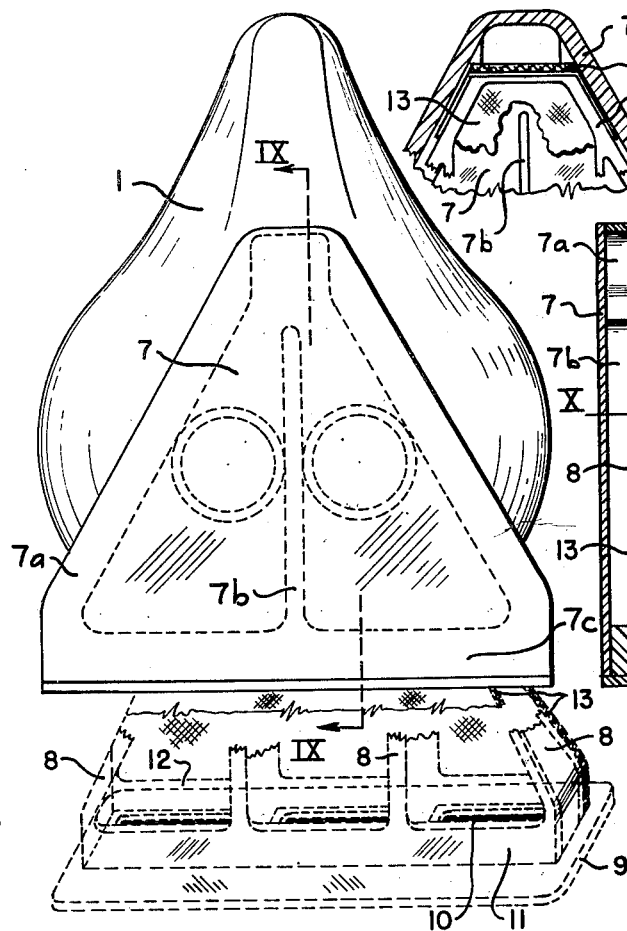
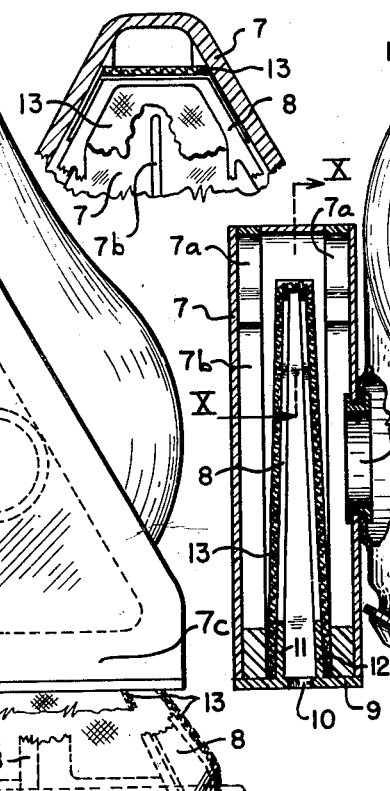
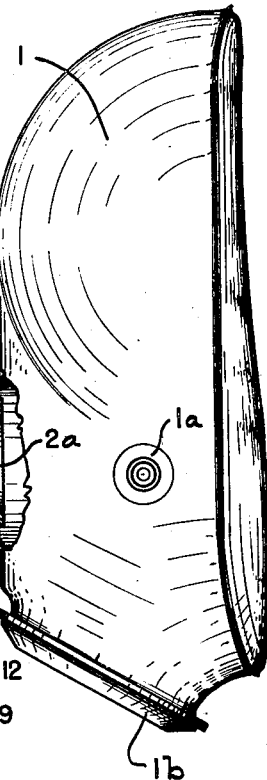
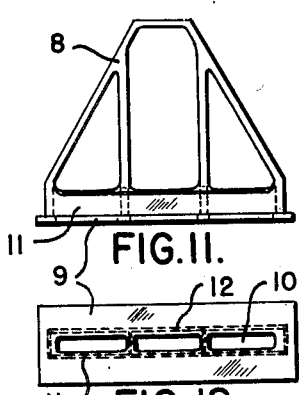
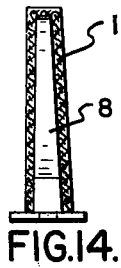
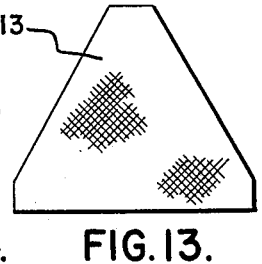
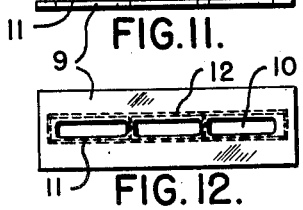
INVENTOR.
WINFIELD W. LOOSE Patented Dec. 19, 1950

2,534,720

UNITED STATES PATENT OFFICE 2,534,720

RESPIRATOR

Winfield W. Loose, Washington, D. C., assignor to Willson Products, Inc., Reading, Pa., a corporation of Pennsylvania Application November 29, 1949, Serial No. 129,913

11 Claims. (Cl. 128—146)

This invention relates to improvements in respirators, and more particularly, to filter type respirators adapted to cover the nose and mouth of the wearer for the purpose of protection against dust, fumes and noxious gases.

An outstanding disadvantage of many common types of filter respirators is that the filters are not readily removable or replaceable with respect to the filter holder. Another disadvantage is that the filter holders are usually disk-shaped, hence provide an obstruction to the view of the wearer, particularly in a downward direction. A still further disadvantage is that most of the conventional types of filter holders are somewhat bulky and complicated in design, therefore expensive to manufacture.

An object of the present invention is to provide a novel respirator that is devoid of the above named disadvantages of common types of respirators.

A more specific object of this invention is to provide a filter type respirator which is adapted to cover the nose and mouth of the wearer and which includes a novel filter box holder constructed in a manner so as to greatly facilitate replacement of the filter when laden with dust.

A more specific object of this invention is to provide a respirator having a novel filter receiving box which is so constructed and shaped as to make it possible to slide the filter into place or out of place and at the same time provide a minimum obstruction to the view of the wearer as well as to provide maximum filtering area and compactness to give efficient filtration with minimum resistance to breathing.

Other objects and advantages of this invention will become apparent from a study of the following specification taken with the accompanying drawings wherein:

Fig. 1 is a front elevational view of a respirator including a filter box embodying the principles of my invention and showing in dotted lines a portion of the filter holding slide when slid outwardly from the filter container or box;

Fig. 2 is a side view with the filter box in longitudinal cross-section taken along line II—II of Fig. 1;

Fig. 3 is a front elevational view of the filter holding slide shown in Figs. 1 and 2;

Fig. 4 is a side view of the slide shown in Fig. 3;

Fig. 5 is a bottom view of the slide shown in Figs. 3 and 4 and showing the position of air inlet holes;

Fig. 6 is a plan view of the filter pad adapted to be supported by the slide shown in Figs. 3, 4 and 5.

Fig. 7 is a longitudinal cross-sectional view of the pad shown in Fig. 6;

Fig. 8 is a front elevational view of a modified form of respirator having twin filtering surfaces showing the filter pad supporting slide in an extended position illustrated in dotted lines;

Fig. 9 is a side view of the respirator shown in Fig. 8 with the filter box shown in longitudinal cross-section taken along line IX—IX of Fig. 8;

Fig. 10 is a fragmentary longitudinal cross-sectional view taken along line X—X of Fig. 9 showing the top or apex portion of the filter box;

Fig. 11 is a front elevational view of the filter holding slide shown in Figs. 8 to 10, but in somewhat reduced size;

Fig. 12 is a bottom view of the slide shown in Fig. 11;

Fig. 13 is a plan view of one of the twin or double filter units shown in Fig. 14; and Fig. 14 is a side view of the slide shown in Figs. 11 and 12 with the twin or double filter pad folded and supported thereon.

Referring more particularly to Fig. 1, numeral 1 denotes a face piece or mask made of rubber or other flexible material and adapted to be snugly fitted to the face of the wearer. The mask is substantially cup-shaped and of somewhat triangular outline. The upper or pointed portion of the mask is adapted to surround the nose, the curved side portions are adapted to snugly fit the cheeks and the lower portion is adapted to fit about the chin so that by forming a close fit with the face of the wearer throughout the entire perimeter only filtered air can be breathed inwardly of the nose and mouth. At the sides of the mask 1 there are provided snap fasteners such as 1a to which straps (not shown) may be attached and tied at the back of the head of the wearer in a well-known manner. At the front of the mask there is provided an inhalation valve 2a in the form of a pair of rubber flaps or diaphragms (not shown) which are one-way acting, that is, allow air to be inhaled but which are forced closed by exhaled air. At the lower part of the mask there is mounted an exhalation valve 1b in the form of a thin rubber disk covering holes at the bottom of the mask so that when air is exhaled, the disk-shaped rubber diaphragm will flex outwardly uncovering the holes, but when inhaled, the disk will be drawn tightly over the holes to seal them against incoming air.

An important feature of the present invention resides in the specific construction, shape and arrangement of the filter box or container 2. Filter box 2 is somewhat triangular in shape, having its apex adjacent the nose encompassing end of the mask, and its sides substantially parallel to but lower than the corresponding sides of the mask, thereby providing minimum obstruction of view of the wearer, particularly in a downward direction. By having the filter cup conform in shape as nearly as possible to that of the mask, not only a minimum of obstruction to the view of the wearer will be provided, but at the same time maximum filtering area is provided for efficient filtering with minimum resistance to breathing. The triangular-shaped box or cup 2 has inlet openings 2b extending throughout a substantial portion of the length of each side thereof. Box 2 may be made of plastic material, such as transparent Lucite or the like, thin metal, or of other suitable material which is light in weight. An opening is provided at the bottom of the triangular box 2 into which is adapted to be slid a filter holding slide plate 3 which is preferably of open web or truss formation as shown more clearly in Fig. 3 so as to provide maximum opening therethrough and yet sufficient rigidity to serve as a filter support. At the bottom of the slide plate or slide 3, there is a flange 5 which serves as a closure member for the bottom of the triangular cup 2 and which has a plurality of holes 5a, as shown in Fig. 5, serving as additional air inlet openings. Near the bottom of slide 3 there is a notched or cut out portion 4 for receiving and supporting a filter pad 6 which may be of felt impregnated with any suitable chemical, or of any other suitable filtering material, such as sponge rubber, etc. It will be apparent that when the filter pad is supported on the shoulder or cut out portion 4 of the slide in the manner illustrated in Fig. 2 and slid inwardly of cup 2 so that flange 5 acts as a closure member for the bottom part of the filter cup 2, the filter assembly will be in position for use. Spacer ribs, such as 2c and 2d, are integrally formed inwardly of the peripheral portions of the front and rear walls of the cup as well as centrally thereof in a vertical direction to provide lateral support to the filter pad at the rear wall and to the slide at the front wall, thereby providing air spaces adjacent these walls.

In operation, when the filter mounted slide is in place, that is, with flange 5 in abutment with the lower peripheral marginal flanges 2c and 2d of the filter box, flange 2d being slotted as shown in Fig. 2, air will enter the side inlet openings 2b as well as the lower apertures 5a and will enter through the slots of flange 2d and into the space between the outside or forward wall of the filter box and filter 6. As the operator inhales, air will be drawn through filter 6 into the space rearwardly of the filter, that is, the space between it and the rear wall, thence will travel through the inhalation valve 2a into the nose and down to the lungs of the wearer. At this time, the exhalation valve 1b is drawn closed. As air is exhaled, the inhalation valve 2a will be pushed closed and the exhalation valve 1b opened to let out exhaled air. Since substantially the entire area of filter 6 is exposed to incoming air, it will provide an efficient filter offering minimum resistance to breathing. When it is desired to replace the filter after it has become laden with an excess of dust, flange 5 is grasped and pulled downwardly beyond the dotted line position and filter 6 is replaced by a new one. Thereafter the slide 3 is slid back into place very quickly and easily.

Figs. 8 to 15, inclusive, show a modification of the filter cup and filter embodying the present invention. Onto mask 1 which is of identical construction as that described hereinbefore, there is appended a filter box 7 of triangular shape having vertically extending ribs or spacer elements 7b integrally formed inwardly of the front and rear walls of the cup and, in addition, marginal ribs or flanges 7a which extend along the periphery of the box inwardly of the front and rear walls thereof to provide lateral support to the filter and to provide air spaces adjoining the front and rear walls. The slide 8, which may be made of the same material as the filter box, that is, either plastic, light metal or other suitable material, has a shape which is more clearly illustrated in Figs. 11, 12 and 14. Slide 8 has a pair of vertically extending flanges or webs and two angularly disposed flanges terminating in a short perforated horizontal top flange as shown in Fig. 11. A bottom flange 9 is provided serving as a closure plate for the filter cup 7 and having centrally disposed air inlet apertures 10 whose ends terminate adjacent the flange portions of the slide. A twin or double filter pad 13 is draped over the top of the slide 8 so that two somewhat triangular portions thereof of the shape shown in Fig. 13 will cover both sides of the slide as indicated more clearly in Fig. 14. In other words, by cutting a single filter pad in somewhat butterfly shape, and folding the central portion over the top of the slide, there would be provided in effect two spaced filter sheets, one on each side of the slide, the bottoms of which are supported by the bottom flange 9. The sides of the filter box 7 are completely closed so that air can enter only the bottom air inlet apertures 10.

In operation, when the slide with the filter pad 13 mounted thereon is slid into the filter box with flange 9 in abutment with the horizontally extending marginal flanges 7c, as shown in Fig. 9, the respirator is completely assembled for use. As air is inhaled by the wearer, air will enter the three lower apertures 10 of the slide 8, go through the correspondingly apertured web 11—12 of the slide into the space centrally of the slide bounded by the front and rear pad sections, thence will travel through the pad sections to become filtered so that filtered air will enter the spaces between the pads and the front and rear walls of the filter cup 7 and will be breathed through inhalation valve 2a into the lungs. It will be noted that the filtered air spaces near the top of the filter cup are in intercommunication at the apex of the filter box, that is, just above the folded top portion of the filter so that air will travel freely from the front cover section to the rear cover section, will enter the inhalation valve 2a and will be breathed in through the nose. Exhaled air will be exhausted through the one-way acting rubber disk exhalation valve 1b in the normal manner. The outstanding feature of the modification shown in Figs. 8 to 13, inclusive, is that it provides two triangular filtering surfaces instead of one so as to give double the filtering surface area and greater ease of breathing—also, it will allow a reduction in size of the triangular filter cup, giving an extremely compact construction and yet provide effective filtering.

Of course, when it is desired to replace the filter, the flange portion 9 of the slide is grasped and pulled outwardly beyond the position shown in dotted lines so that access may be had to the filter pad for its removal and replacement by a new filter. Of course, two separate triangular pads could be used instead of the single pad 13.

Thus it will be seen that I have provided a very efficient filter-type respirator wherein the filter cup or box is so shaped as to provide minimum obstruction to the view of the wearer, particularly in a downward direction, and which filter cup encloses a slide for supporting a filter pad in a simple manner so that it may be readily slipped into and out of place for easy replacement of the filter pad when an abnormal amount of dust is collected thereon.

In Figs. 9 and 14 I have shown slide 8 as upwardly tapered and the recess in filter box 7 may, if desired, be correspondingly tapered to snugly receive the slide 8 and the filter pad 13 carried thereon. The slide plate 3, shown in Figs. 2 and 4, is not indicated as tapered like the slide 8 of Fig. 14, but it may be desirable at times to so taper this slide plate 3 and the recess therefor in the filter box 2, and my disclosure is intended to include such tapered construction.

While I have illustrated and described certain modifications of my invention, it will be understood that these are by way of illustration only, and that various changes and modifications may be made within the contemplation of my invention and within the scope of the following claims.

I claim:

1. A respirator comprising a face piece of substantially triangular and cup-like configuration shaped to fit over the nose, mouth and chin of the wearer and having an air opening, a filter box of substantially triangular outline with its apex adjacent the nose engaging portion of said face piece and its sides substantially parallel to but disposed slightly below those of said face piece, thereby minimizing obstruction to the wearer's view, particularly in a downward direction, and filter supporting means for readily inserting or withdrawing a filter from said box.

2. Apparatus recited in the previous claim wherein said filter supporting means comprises an apertured slide plate having a base flange which forms a closure plate for said filter box.

3. A respirator comprising a face piece of resilient material and being cup-like and substantially triangular in outline and shaped to engage the nose, chin and sides of the face about the mouth of the wearer, a filter box of substantially triangular shape connected to and in intercommunication with the space within said face piece, the apex of said filter box being disposed adjacent the nose engaging portion of said face piece and the sides thereof being substantially parallel to and slightly below corresponding cheek engaging side portions of the face piece, and a removable slide plate comprising a base portion which serves as a closure plate for said filter box and an open webbed portion integrally formed therewith extending at right angles therefrom, said web portion adapted to support a filter pad, said filter box being apertured so as to permit incoming air to enter the space between the filter pad and wall of said filter box most remote from the wearer.

4. Apparatus recited in the preceding claim wherein the said filter box is provided with apertures on the edge portions thereof to serve as air inlet openings to introduce air into the space in front of the filter pad remotest from the wearer, and wherein said base flange of the slide plate is provided with apertures to allow entry of air into said space.

5. Apparatus recited in claim 3 wherein the front and rear walls of said filter box are provided with integral spacer elements for spacing the filter therefrom and wherein said slide plate is provided with an apertured portion projecting inwardly of the box to serve as a support for the filter pad.

6. Apparatus recited in claim 3 wherein the front and rear walls of said filter box are provided with spacing integral rib portions and wherein said slide plate has an inwardly extending webbed filter support having a notch on one side thereof in which is adapted to be supported the lower edge of a filter pad.

7. A respirator comprising a face piece adapted to be fitted over the nose, mouth and chin of the wearer, a triangular shaped filter box attached thereto and in intercommunication therewith and having an opening in the lower side thereof, a slide plate adapted to be slid into said opening, said slide plate having a lower flange portion serving as a closure plate for said box and having a filter supporting portion extending from the central portion of said closure plate inwardly of said box, and a pair of filtering sheets conforming substantially to the triangular shape of said box, one supported on each side of said slide plate whereby air entering through centrally disposed apertures in said closure plate will flow through both of said filtering sheets into the space between said sheets and the front and rear walls of said box, thence into said face piece wherein filtered air is inhaled.

8. Apparatus recited in the preceding claim wherein said filter supporting portion of the slide plate extends at right angles to said closure plate and inwardly of said filter box, said filter sheets including a sheet of filtering material supported against one side of said filter supporting portion and a second sheet supported on the other side thereof so that air, after entering the space between said filtering sheets will flow therethrough and become purified thereby thence will flow into the space between said filtering sheets and the outer and inner walls of the filtering box, thence into the mask so as to be breathed into the lungs.

9. Apparatus recited in claim 7 wherein said filtering sheets comprise a single pad of filtering material of somewhat butterfly shape and folded at the central interconnecting portion over the top of said filter supporting portion forming substantially two triangular portions in slightly spaced relationship on opposite sides of said filter supporting portion with its lower edges supported on opposite marginal flange portions of said closure plate.

10. Apparatus recited in claim 7 wherein the front and rear walls of said filter box have integral spacing elements adapted to space said filter sheets away therefrom and provide a space for filtered air, there being an intercommunicating space between the front and rear air spaces adjacent the apex of said filter box closest to the top thereof.

11. A respirator comprising a respirator face piece of cup-like shape and of substantially triangular configuration and adapted to be fitted about the nose, cheeks and chin of the wearer, an inhalation valve supported adjacent the nose engaging portion of the face piece, an exhalation valve disposed at the base of said face piece, a filter box of substantially triangular shape connected to said face piece and being in intercommunication therewith through said inhalation valve, the bottom edge portion of said filter box being open, the front and rear walls of said filter box having spacer elements integrally formed therewith, a slide plate comprising a bottom flange portion serving as a closure plate for said box and a substantially triangular filter supporting portion extending at right angles thereto inwardly of the box, air inlet aperture means disposed centrally of said closure plate, a filter pad of somewhat butterfly shape folded over on itself on its central portion and over the apex portion of said filter supporting portion, thereby providing a filter sheet on each side thereof, each of substantially triangular configuration with its base edge supported on said closure plate, whereby air entering said air inlet aperture means will travel through said filter sheets into the spaces adjacent the front and rear walls of said box, said last mentioned spaces being in intercommunication at the apex of said box closely adjacent the nose forming portion of the mask.

WINFIELD W. LOOSE.

REFERENCES CITED

The following references are of record in the file of this patent:

UNITED STATES PATENTS

| Number | Name | Date |
|---|---|---|
| 311,776 | Nitz | Feb. 3, 1885 |
| 2,220,374 | Lewis | Nov. 5, 1940 |

FOREIGN PATENTS

| Number | Country | Date |
|---|---|---|
| 117,262 | Australia | July 13, 1943 |

OTHER REFERENCES

Modern Plastics, page 19, January 1943. (Copy in Div. 55.)